United States Patent
Reich

[15] 3,639,753
[45] Feb. 1, 1972

[54] SYSTEM FOR GOVERNING THE SPEED OF RAILWAY VEHICLES

[72] Inventor: Simon Reich, New York, N.Y.
[73] Assignee: General Signal Corporation, Rochester, N.Y.
[22] Filed: Sept. 15, 1969
[21] Appl. No.: 857,974

[52] U.S. Cl. ..................................................246/182 C
[51] Int. Cl. ...........................................B61l 3/00, G01p 3/12
[58] Field of Search ......................246/182 B, 182 C, 187 C; 324/173

[56] References Cited

UNITED STATES PATENTS

| | | | |
|---|---|---|---|
| 3,500,190 | 3/1970 | Michon | 324/161 |
| 3,363,096 | 1/1968 | Hughson et al. | 246/182 B X |
| 3,568,149 | 3/1971 | Sibley | 340/146.1 |
| 3,340,951 | 9/1967 | Vitt | 246/182 C |
| 3,525,044 | 8/1970 | Richmond | 324/173 |

Primary Examiner—Arthur L. La Point
Assistant Examiner—George H. Libman
Attorney—Harold S. Wynn

[57] ABSTRACT

Traction and braking of a train is governed by comparing a desired speed signal with digital speed signals that are periodically generated indicative of actual speed of the train. The digital speed signals are attained by counting frequency pulses of an axle driven frequency generator during successive time gate periods. Means is provided for modifying the time duration of the time gate in accordance with changes in diameter of a wheel of the vehicle. The digital output is in miles per hour and is also used to control a speed indicator.

5 Claims, 2 Drawing Figures

SYSTEM FOR GOVERNING THE SPEED OF RAILWAY VEHICLES

While the invention is subject to a wide range of applications, it is especially suited for use in a system for governing the speed of railway vehicles and will be particularly described in that connection.

Various systems have been proposed for controlling a railway vehicle by comparing analogs of desired and actual speed signals to obtain an error signal for use in regulating the power operation and/or the braking of the vehicle. It has been found to be difficult to maintain the degree of accuracy desired in computing the analog values, particularly if changes in wheel diameter due to wheel wear are not compensated for.

An object of the present invention is to provide a system for governing the speed of railway vehicles which substantially obviates one or more of the limitations of the described prior arrangements.

Another object of the present invention is to provide an improved, simplified and inexpensive system for governing the speed of railway vehicles.

SUMMARY OF INVENTION

The present invention provides a system for governing the speed of a railway vehicle in accordance with comparison of a desired speed signal with an actual speed signal generated by an axle driven frequency generator. Means is provided for periodically generating timing gate signals of the same duration, subject to modification of the time duration of the pulses in accordance with changes in diameter of the vehicle wheel. Counting means is governed jointly by the output of the axle-driven frequency generator and the time gate signals for periodically generating digital speed output signals. Control means is provided that is governed jointly by the desired speed signal and the digital speed output signal for governing the speed of operation of the vehicle.

For a better understanding of the present invention, together with other and further objects thereof, reference is had to the following description, taken in connection with the accompanying drawings, while its scope will be pointed out in the appending claims.

Figure 1:
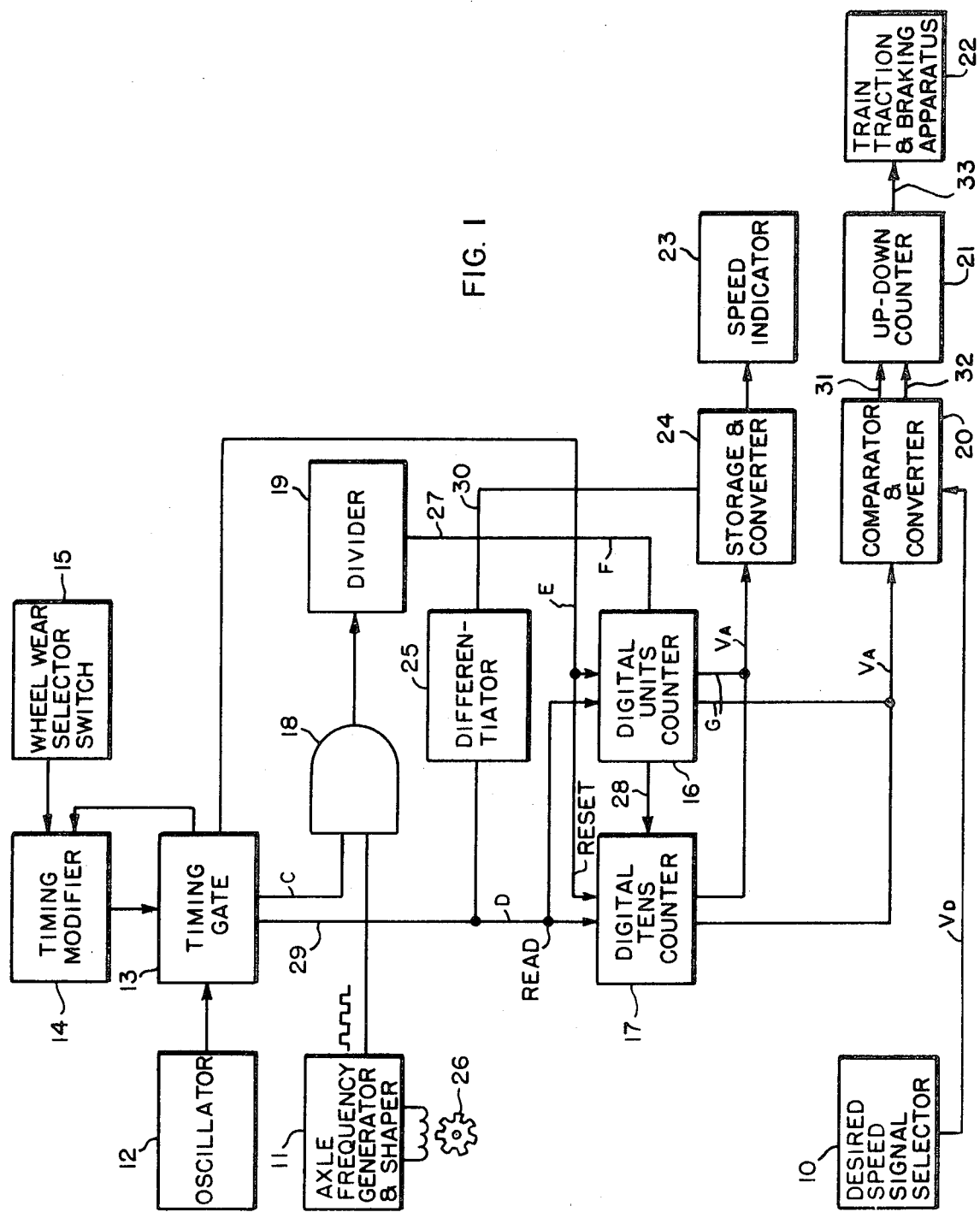
FIG. 1 is a block diagram showing the system concept.

With reference to the accompanying FIG. 1 a system is disclosed for governing the speed of a railway vehicle in accordance with the comparison of a desired speed signal $V_D$ generated by desired speed signal selector 10 with an actual speed signal $V_A$ which is derived from an axle frequency generator and shaper 11. Means is provided for periodically generating timing gate signals comprising an oscillator 12 which applies its output to a timing gate divider 13 which generates periodically time gating signals. The duration of the time gate can be modified from time to time by a timing modifier 14 which governs the time duration of the timing gate pulses in accordance with the setting of a wheel wear selector switch 15. Counting means comprising digital units counter 16 and digital tens counter 17 are responsive during each time gate interval to axle generated output pulses of the axle frequency generator and shaper 11. These pulses are applied through an AND-gate 18 which is enabled by the timing gate divider 13, and the output of gate 18 is applied through a divider 19 to the digital units counter 16. The digital units counter 16 applies an output every 10 counts to the digital tens counter 17. Control means in the form of comparator and converter 20, up-down counter 21 and train traction and braking apparatus 22 are provided to govern the speed of operation of the vehicle in accordance with comparison of digital actual speed signals $V_A$ with desired speed signals $V_D$.

A speed indicator 23 is also controlled in accordance with outputs of the digital counters 16 and 17. Speed indicator 23 is more directly controlled by a storage and converter 24, which in turn is updated during each timing gate cycle by an output of the digital counters 16 and 17. A differentiator 25 is provided for resetting the storage 24 at a time when it is to be updated by output from the digital counters 16 and 17.

For the preferred embodiment, the oscillator 12 generates a relatively high frequency to obtain the accuracy of timing desired. A frequency of 33.333kHz. has been found to be satisfactory for driving timing gate divider 13 which can be a divide by $2^{15}$ binary divider. The frequency of the oscillator 12 can of course be a different frequency, and the number of divider stages can be different in accordance with the requirements of practice. The timing gate divider 13 also includes gates for initiating a timing cycle, for generating a read pulse at the end of each cycle and for generating a reset pulse at the end of each cycle. It is contemplated that the timing gate divider 13 may be an apparatus as described in a patent to H. C. Sibley, U.S. Pat. No. 3,568,149, wherein a divider is used to deliver certain selected outputs to gates for producing signals of a certain duration. The timing modifier 14 comprises a plurality of gating circuits for selectively terminating the timing cycles generated by the timing gate 13 in accordance with the wheel diameter selected by the wheel wear selector switch 15, which can be manually actuated. The gates which govern the output of the timing gate divider 13 are enabled by certain gates of the timing modifier 14 which is controlled by the wheel wear selector switch 15. By this means, the length of the output of the timing gate divider 13 may be determined in order to provide an accurate actual speed signal. The timing gate divider may, for example, include a set of gates which count pulses from the oscillator 12 and the output is of one character, i.e., "ON." When the cycle is begun, it remains in that condition until the oscillator 12 sequentially drives all the enabled gates "OFF" and the output ceases which is sensed by the modifier which in turn resets the timing gate divider for the next cycle.

The axle frequency generator and shaper 11 is preferably directly operated by a wheel axle of the vehicle, and a toothed wheel 26 is used in generating a frequency directly related to the speed of the vehicle. Output of the axle frequency generator and shaper 11 is in the form of square wave pulses which are applied to AND-gate 18 so that the pulses are delivered to divider 19 during a timing gate cycle as determined by the timing gate divider 13, an output of which enables gate 18 to provide an output frequency to divider 19. The divider 19 can be a three-stage binary divider wherein the three stages correspond to one-eighth, one-quarter, and one-half m.p.h. The divider 19 may also be a part of the apparatus shown in the previously referenced Sibley Patent. Thus outputs can be taken from the divider 19 at these respective stages if fractional m.p.h. of speed are required to be indicated or to be used in the control of the vehicles. Each time the divider 19 completes this cycle, it provides an output over line 27 which is delivered as an input to the digital units counter 16. The digital units counter 16 can be a conventional binary-coded decimal counter, for example, and this counter delivers an output each time it is full over line 28 to the digital tens counter 17 which can also be a binary-coded decimal counter. Thus digital speed in m.p.h. can be read out of these two counters in combination for use in governing the speed of operation of the vehicle and in indicating the vehicle speed.

At the end of each timing pulse as generated by the timing gate divider 13, a read pulse is generated and delivered over line 29 to cause the counters 16 and 17 to deliver an output to the comparator and converter 20 and to the storage and converter 24. The start of the read pulse on line 29 causes differentiator 25 to deliver a reset pulse on line 30 to reset the storage 24 so that it can be updated by an input on line $V_A$ from counters 16 and 17. Thus input is applied periodically (at the end of each timing cycle) to storage and converter 24, which updates speed indicator 23. The type of storage and conversion required is of course dictated by the type of speed indicator used, in accordance with the requirements of practice.

Figure 2:
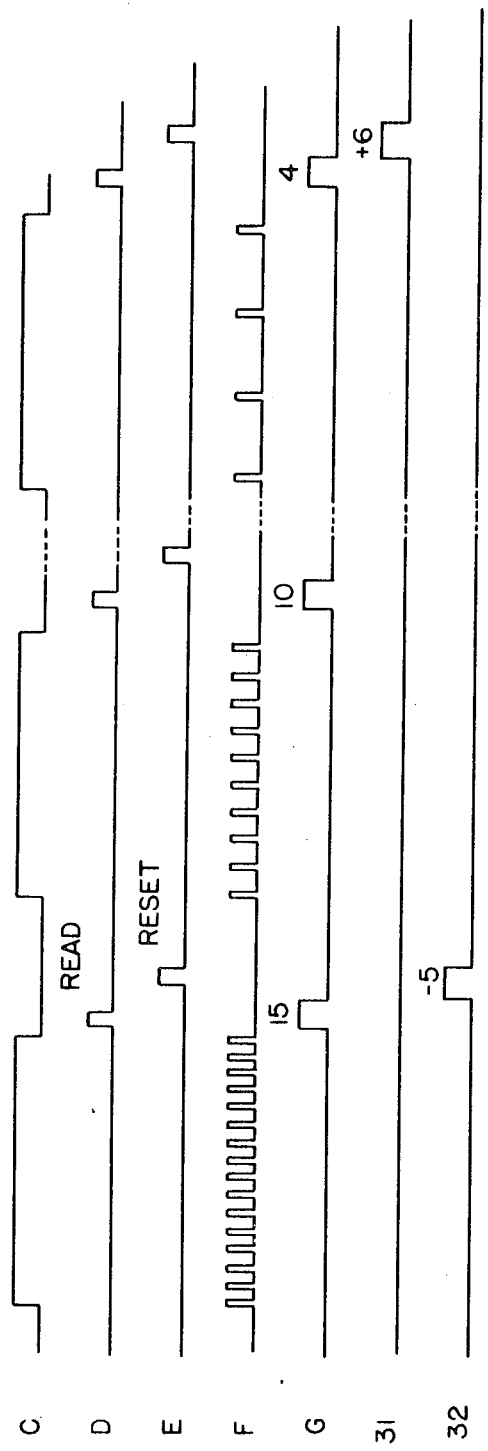
FIG. 2 is a wave form diagram taken at selected outputs for explaining the operation of the apparatus of FIG. 1.

The comparator and converter 20 delivers an output for each timing cycle when $V_A$ is less than $V_D$ on line 31, and it delivers an output for each timing cycle on line 32 when $V_A$ is greater than $V_D$. Hughson et al. U.S. Pat. No. 3,363,096 shows a type of comparator apparatus contemplated in the present disclosure. The comparator and converter unit 20 converts the input signals from the desired speed signal selection 10, and the counters 16 and 17, into analog signals and then produce selected outputs to terminals 31 and 32. Energy on lines 31 and 32 is applied as inputs to the up-down counter 21 to operate that counter up or down accordingly. It is to be understood that input on lines 31 and 32 to counter 21 can be applied through integrating means if desired to distinguish from possible noise pulses by requiring a given number of pulses for successive timing cycles to be on an input line 31 or 32 before a change can be made in the counter 21. It will be readily apparent that the stepping up or down of the counter 21 is indicative of a call for more or less tractive effort respectively, which is communicated over line 33 to govern the train traction and braking apparatus 22 accordingly. The apparatus 22 acts upon the speed of the vehicle, which is in turn monitored for further correction during subsequent timing cycles by the axle frequency generator 26. The wave forms shown in FIG. 2 illustrate the sequence of events which occur during each cycle of operation. The output of timing gate divider 13 at C shows that for selected intervals of time, pulses of the axle generator are fed through gate 18 enabled by the "in" condition of divider 13. Output D is a read pulse produced when the timing cycle is over, dumping count information from counters 16 and 17 into the storage 24 and comparator 31. The divider 13 also resets the counters 16 and 17 in accordance with the output E after the information is transferred to the storage 24 and comparator 31. Output G indicates the number counts transferred to the comparator, while outputs 31 and 32 indicate the discrepancy between the actual speed signals and the desired speed signals. For example, plus (+) 6 in line 31 indicates that the up-down counter 21 must increase its output to correct the traction control 22 while minus (−) 5 in line 32 indicates a reduction in output by that amount is necessary. The +6 and −5 signals represent discrepancies between desired speed signals and actual speed signals. The gate length C in FIG. 2 should be reduced as the wheels wear because more counts per unit time are produced as the diameter of the wheel decreases.

All of the apparatus that has been described is preferably carried on the vehicle, however, the desired speed signal selector 10 can be partly on the vehicle and partly at the wayside where desired speed signals are communicated as by selected continuous rate codes or digital codes from the wayside to the vehicle.

While there has been described what is at present considered to be the preferred embodiment of the invention, it will be obvious to those skilled in the art that various changes and modifications may be made therein, without departing from the true spirit and scope of the invention.

What is claimed is:

1. A system for governing the speed of a railway vehicle in accordance with comparison of a desired speed signal with an actual speed signal derived from an axle-driven frequency generator wherein the improvement comprises;
    a. means comprising an oscillator for generating pulses at a fixed rate and means for dividing the frequency of the oscillator to generate successive timing gate pulses of the same selected relatively long duration,
    b. timing gate modifying means comprising a wheel wear switch for at times incrementally modifying the time duration of the timing gate pulses in accordance with changes in wheel diameter,
    c. means responsive to the axle frequency generator and rendered effective only during each timing gate pulse for dividing the axle generator frequency and generating a series of speed pulses corresponding to the divided frequency,
    d. counting means for counting the speed pulses during each timing gate pulse and delivering a digital speed output upon termination of each timing gate pulse corresponding to the number of speed pulses counted during the associated gate pulse, and
    e. control means governed jointly by the digital speed output and by the desired speed signal for governing the speed of operation of the vehicle.

2. The invention according to claim 1 wherein the counting means includes a frequency divider for dividing the frequency output of the axle generator by a factor such that the digital speed output signal manifests the speed of the vehicle in m.p.h.

3. The invention according to claim 1 wherein storage means is provided for storing the last output of the counting means and speed indicator means is provided for registering the speed of the vehicle as stored by the storage means.

4. The invention according to claim 1 wherein the control means comprises an up-down counter that is selectively stepped up or down in accordance with comparison of the desired speed signal and the digital speed output signals.

5. The invention according to claim 4 wherein the control means comprises train traction and braking means that is controlled by the up-down counter.

* * * * *